*E. Wright,*
Cock.
N° 10,082.  Patented Oct. 4, 1853.
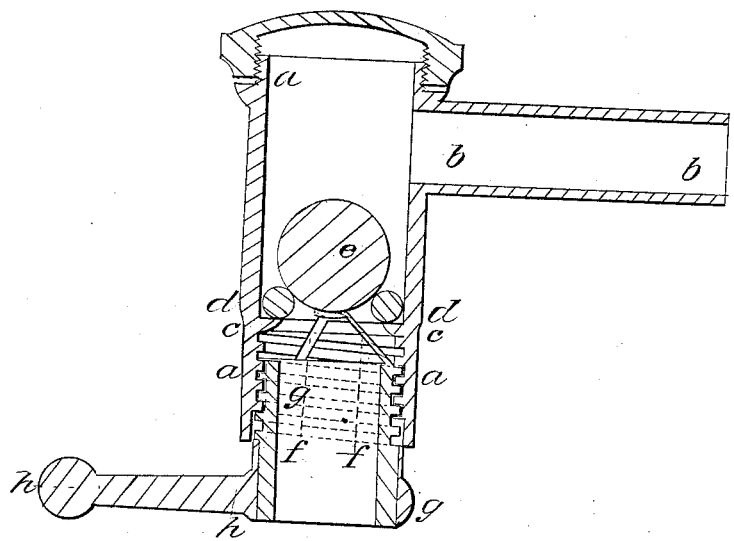

UNITED STATES PATENT OFFICE.

ELIZUR WRIGHT, OF BOSTON, MASSACHUSETTS.

STOP-COCK.

Specification of Letters Patent No. 10,082, dated October 4, 1853.

*To all whom it may concern:*

Be it known that I, ELIZUR WRIGHT, of Boston, in the county of Suffolk and State of Massachusetts, have invented a new and useful Stop-Cock or Valve for Drawing Water Where There is Considerable Head or Pressure, and that the following description, taken in connection with the accompanying drawing, hereinafter referred to, forms a full and exact specification of the same, wherein I have set forth the nature and principles of my said invention, by which it may be distinguished from others of a similar class, together with such parts as I claim and desire to have secured to me by Letters Patent.

My improvements are represented in the accompanying drawing which is a central section of the stop-cock.

The usual mode of making stop-cocks is an operation of considerable nicety, and one which requires the skill of an experienced workman in order to be properly executed, as the parts of which the stop-cock are composed have to be very accurately fitted and made of hard metal in order to prevent their wearing away by friction, and the consequent difficulty of keeping the cock tight.

My improved stop-cock or valve is so contrived as to render unnecessary any accurate "grinding" or fitting of the parts, the essential features of the same consisting of a solid ball and a soft elastic cylindrical ring, the ball when the valve is closed sitting closely on the ring and stopping the water, and when raised or pushed away from the ring, by a screw or other suitable mechanical contrivance, allowing the water to flow freely.

*a a a* in the drawings represent the main tube of the cock and *b b* the induction tube or passage. In the tube *a a a* is a shoulder *c c* on which is placed a cylindrical elastic ring *d* made of rubber or other suitable material and in case it is made of rubber, sufficiently stiffened by a central wire to prevent being displaced by the rush of the water, this wire is necessary except when the water-way is small. A loose ball *e* is kept by the pressure of the water upon it, so tight to the elastic ring *d* as to effectually prevent the passage of the water down through the said ring. It is preferable that the seat of the ring should make a right angle with the tube *a a a*, into which the rubber may be passed so as not to protrude too much into the exit or water-way. The ball is raised or pushed back from the elastic ring, and the water permitted to run when desired, by a tripod or perforated projection *f f* attached to the screw plug, *g g*, the thread of which engages with a proper female screw cut in the tube *a a a*, the said plug being turned by a handle *h h*. The cock is shut again when desired and the ball dropped on the ring *d*, by lowering the plug *g g*, thus removing the tripod *f f* from against the ball.

It will be seen by the above description, that as the parts require no accurate fitting, the cock can be made of block tin or of any other soft metal which is strong enough to resist the pressure of the water, and that consequently it can be made much cheaper and by less skilful workmen than the cocks in common use, which moreover unlike my improved stop-cock, are very liable to get out of order.

Be it understood that I do not claim to have invented the application of rubber or soft elastic stubstances as packing to valves, nor do I claim to have invented the ball shaped valve, the ball having been previously used to answer as a valve in peculiar circumstances different from those to which my invention applies.

What I claim as my invention and desire to have secured to me by Letters Patent is,

The combination of a ball with an elastic cylindrical ring seat, constructed with or without a wire, as described, for the purpose of forming a valve.

ELIZUR WRIGHT.

Witnesses:
 JOSEPH GAVETT,
 EZRA LINCOLN.